US005152319A

United States Patent [19]

Hannagan et al.

[11] Patent Number: 5,152,319

[45] Date of Patent: Oct. 6, 1992

[54] FLUID DISTRIBUTOR, ESPECIALLY FOR A PRESSURE WAVE MATTRESS

[75] Inventors: Angus P. D. Hannagan, Gosport; Michael A. McGrath, Hayling Island, both of England

[73] Assignee: 501 Pegasus Airwave Ltd., Hampshire, England

[21] Appl. No.: 615,717

[22] Filed: Nov. 20, 1990

[30] Foreign Application Priority Data

Nov. 20, 1989 [GB] United Kingdom ................. 8926213

[51] Int. Cl.[5] .................... F16K 11/074; A47C 27/10

[52] U.S. Cl. ............................... 137/624.18; 137/102; 137/596.2; 91/420; 91/446; 5/453; 5/455

[58] Field of Search ...................... 91/8, 446, 444, 420; 137/624.18, 624.2, 87, 102, 596.2; 5/453, 455

[56] References Cited

U.S. PATENT DOCUMENTS

| | | | |
|---|---|---|---|
| 3,184,921 | 5/1965 | Allen | 91/446 X |
| 3,217,732 | 11/1965 | Haugeland | 137/117 |
| 4,193,149 | 3/1980 | Welch | 5/453 X |
| 4,570,661 | 2/1986 | Chaplin | 137/596.2 X |

FOREIGN PATENT DOCUMENTS

| | | |
|---|---|---|
| 89/08438 | 9/1989 | PCT Int'l Appl. . |
| 762528 | 11/1956 | United Kingdom . |
| 796746 | 6/1958 | United Kingdom . |
| 901080 | 7/1962 | United Kingdom . |
| 1595417 | 8/1981 | United Kingdom . |
| 2183471A | 6/1987 | United Kingdom . |
| 2208103A | 3/1989 | United Kingdom . |
| 2212058A | 7/1989 | United Kingdom . |

*Primary Examiner*—John Rivell
*Attorney, Agent, or Firm*—Larson and Taylor

[57] ABSTRACT

A fluid distributor for sequentially distributing pressurized fluid from at least one inlet port to a plurality of distribution ports and exhausting fluid from said distribution ports to at least one exhaust port, said distributor having a valve actuated by pressure of fluid supplied at said inlet port and arranged to close said exhaust port when said fluid pressure drops below a predetermined minimum. The distributor is suitable for use in conjunction with an inflatable human body support.

3 Claims, 3 Drawing Sheets

FLUID DISTRIBUTOR, ESPECIALLY FOR A PRESSURE WAVE MATTRESS

BACKGROUND OF THE INVENTION

1. Field of the Invention

The present invention relates to a fluid distributor, especially an air distributor which is particularly but not exclusively intended for use in conjunction with a so-called pressure wave mattress or other similar inflatable human body support, such as a cushion. Pressure wave mattresses and other such supports are used in the medical field to prevent bed sores. In this specification, for convenience we will use the term "mattress" for all such supports. The invention also relates to an assembly of a pressure wave mattress and an air distributor.

2. Description of the Prior Art

In our UK patents 1595417 and 2183471, we disclose pressure wave mattresses which are inflatable with air and air distributors for supplying and controlling the air input. The mattresses comprise arrays of air receivers, in the form of inflatable tubes, and in each case the air distributor directs the air to each array in sequence.

In GB-A-1595417 (US-A-4193149),the air distributor comprises a chamber in which a rotor is mounted with one major surface in sealing contact with a cover plate or wall. Pressurized air is supplied to the chamber in a peripheral air inlet in the cover plate. Three circumferentially spaced air outlets lead from the cover plate, in the region thereof contacted by the rotor. Apertures are provided in the rotor at appropriate positions for cyclic alignment with the said outlets so that as the rotor turns air is cyclically fed to said outlets. The rotor is also provided with a recess in its surface contacting the cover plate, which is disposed so as to cyclically connect the said air outlets to a vacuum source, via a centrally located port in the cover plate. Consequently, during each revolution of the rotor, the respective outlets are sequentially supplied with air and then connected to vacuum for exhaustion.

To ensure that the air pressure in the rotor chamber does not reach excessive levels a pressure release valve is also provided. When the air pressure in the mattress falls below a certain level, for example in the event of a power failure, an alarm is sounded.

In GB-A-2183471 (US-A-4711275), the air distributor includes a solenoid valve which is used to prevent the air receivers from losing pressure, by closing the exhaust port for example in the event of an electrical power failure during normal operation. However, the solenoid valve cannot contain pressure loss resulting from a leak in the internal pipework of any compressor unit supplying air to the distributor whilst a normal voltage is still being applied to the apparatus.

SUMMARY OF THE INVENTION

The present invention has the object of providing an air distributor in which loss of pressure from the compressor unit does not lead to deflation of the air receivers.

According to the present invention there is provided a fluid distributor adapted to deliver pressurised fluid to receivers and to allow the receivers to be exhausted, the distributor comprising a pressurised fluid inlet, and an exhaust port, and a valve whereby a decrease in fluid pressure at the inlet below a predetermined minimum causes the exhaust port to be sealed.

In a preferred form, a piston is located between the inlet and the outlet, the piston being movable between a first and a second position under the influence of a fluid pressure at the inlet. In the first position the head of the piston sealingly contacts a valve seat so that fluid flow to the exhaust port is interrupted, whereas in the second position it is spaced from the valve seat so that a fluid path to the exhaust port is provided. Preferably the piston is biassed towards the first position by a spring and moved to the second positon by the pressurised fluid at the inlet.

Generally, the fluid will be air. Such air distributor may suitably be used, in conjunction with at least one compressor to inflate a mattress e.g. a mattress as described in our prior patents.

BRIEF INTRODUCTION OF THE DRAWINGS

An embodiment of the invention is now described, by way of non-limitative example and with reference to the drawings, in which.

DESCRIPTION OF THE PREFERRED EMBODIMENT

Figure 1:
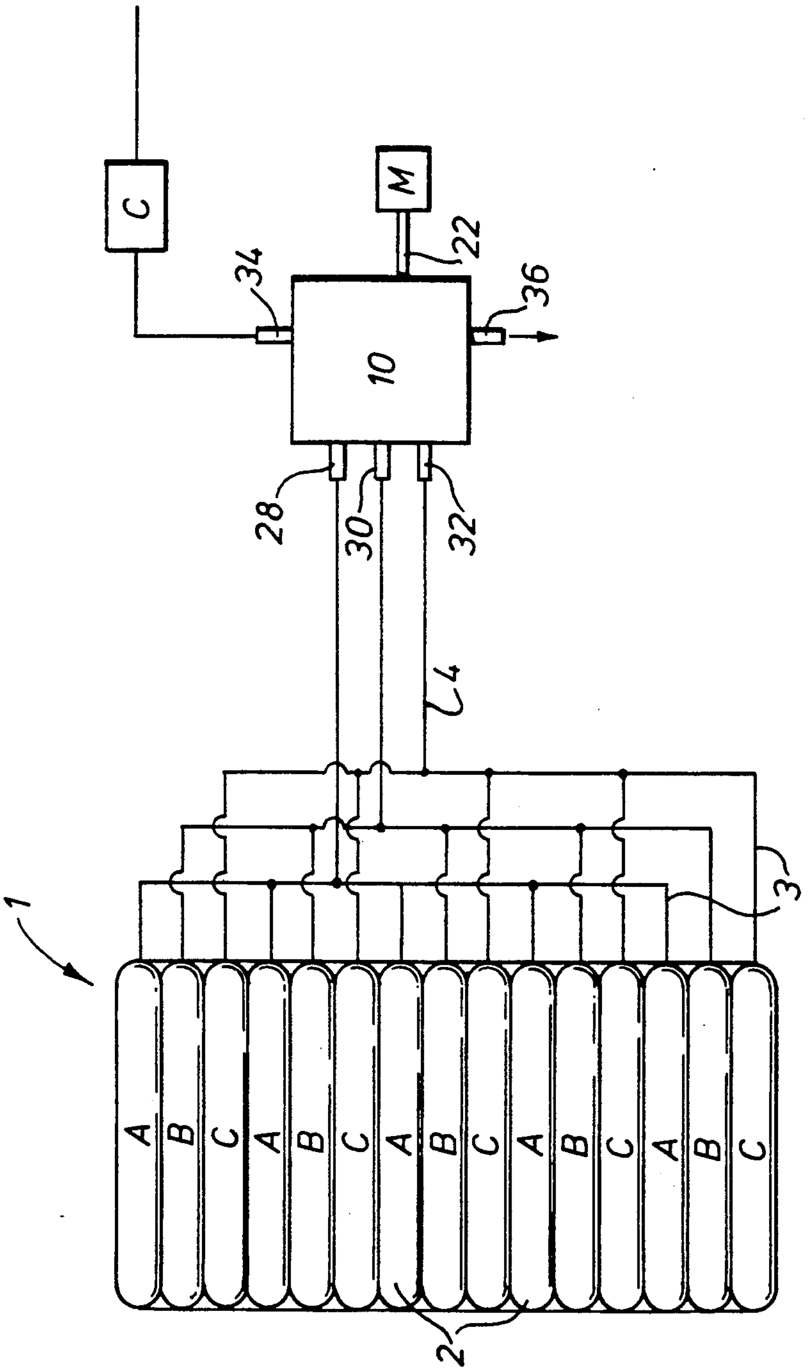
FIG. 1 is a schematic view of a pressure wave inflatable mattress and an air distributor for its control, embodying the invention.

FIG. 1 shows a pressure wave air mattress 1, intended for prevention of bed sores of immobile patients, as discussed above. The mattress is preferably of the type shown in US-A-4193149 the contents of which are herein incorporated by reference. Such mattresses are known, and detailed description is not necessary. Briefly the mattress 1 is shown schematically in FIG. 1 as having a plurality of parallel inflatable tubes 2 extending transversely of its longitudinal direction. These tubes 2 are divided into three overlapping arrays A,B and C which are independently inflatable. The tubes of each of the three arrays are connected together by air lines 3, which are connected by air lines 4 to respective ports 28,30,32 of the air distributor 10.

As described in more detail below, the distributor 10 acts to effect the predetermined cyclical and sequential inflation and exhaustion of the three arrays A,B,C of the tubes 2, so that each array is gradually inflated and deflated. The result is that "pressure waves" move along the mattress, so that the regions of support of a patient are constantly changing.

The pressurized air to inflate the tubes 2 is supplied to an inlet port 34 of the distributor 10 by one or more compressors, one being indicated as C. In practice, more than one compressor is employed, for safety, as described in GB-A-2183471 (US-A-4711275). It is important that, if the compressor or compressors cease to supply compressed air to the distributor 10 for any reason, the exhaustion of any inflated tubes 2 of the mattress 1 is prevented. The distributor 10 includes a valve to achieve this.

Figure 2:
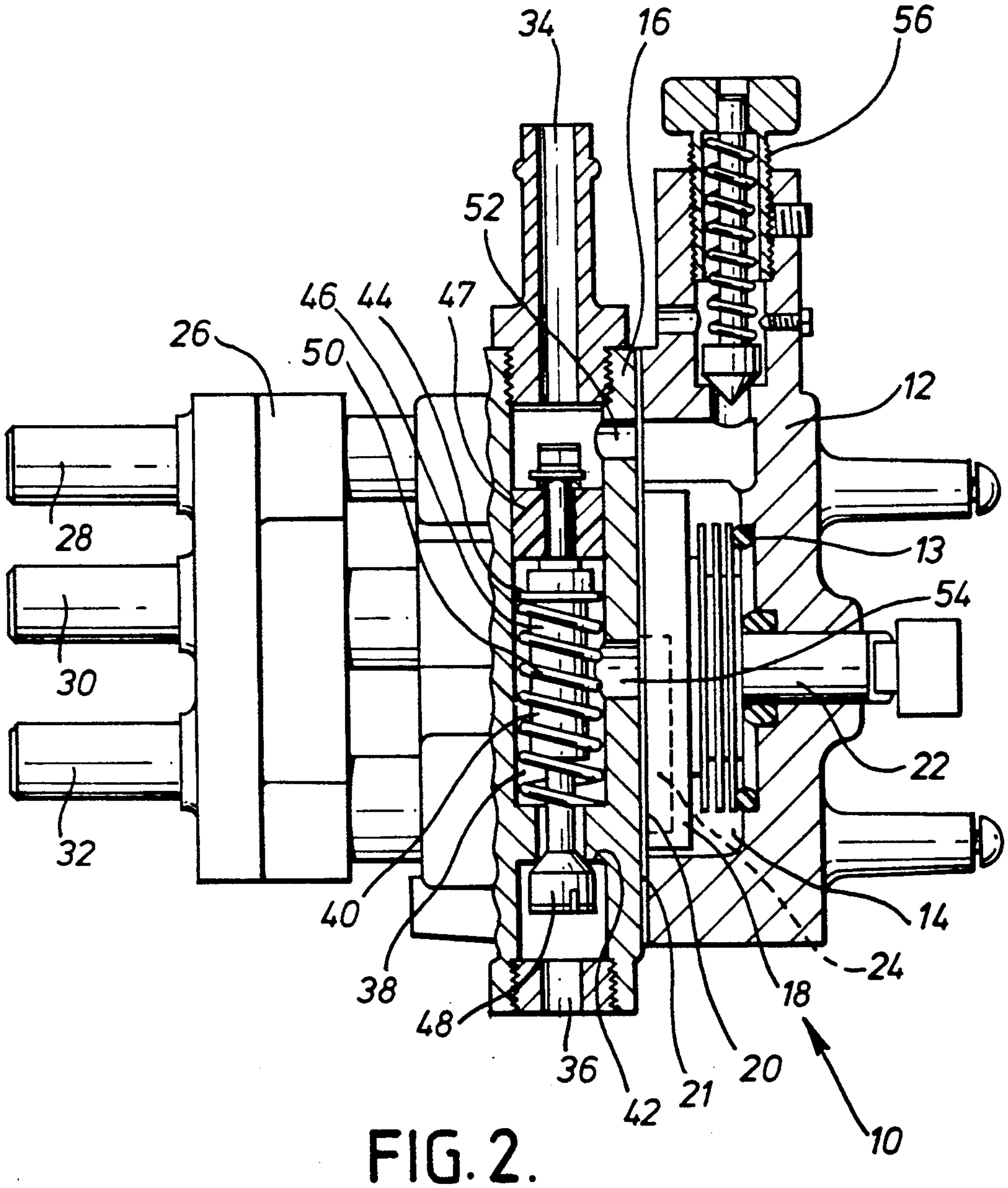
FIG. 2 is a side view, partly sectional, of the air distributor of FIG. 1.

Referring to FIG. 2, the air distributor 10 comprises a housing 12 which has a chamber 14 and a cover assembly 16. A rotor 18 is located in the chamber with its working face 20 abutting a face 21 of the cover assembly. The working face 20 is held against the corresponding face 21 of the cover assembly by compression of an 'O' ring 13. A shaft 22 connects the rotor to a drive motor M shown in FIG. 1.

Mounted on the cover assembly, on the opposite side from the housing, is a connector assembly 26 which has the ports 28,30,32 connected to the mattress 1. A pressurised air inlet port 34 and an exhaust port 36 are located on the cover assembly. A cylindrical bore 38 extends down one side of the assembly, from the inlet to the exhaust port and houses a piston 40. Near the exhaust port 36, the bore is restricted by an annular lip 42 providing a valve seat.

The piston 40 has a head 48 constituting a valve member which is located on the exhaust port-side of the lip 42. On the piston shank 46, remote from the head 48, a double cup washer 47 is mounted as a sliding seal in the bore 38. A helical spring 50 is wound around the shank 46 and is compressed between the lip 42 and a plate 44, which is mounted on the shank 46 adjacent the washer 47. Thus, the piston is biassed upwards to a position where the head 48 will engage the lip 42 and sealing the air path to the exhaust port. However the pressure of air entering through the inlet port 34 acts on the washer 47, contrary to said spring bias, and forces the piston 40 downwards so that the head 48 ceases to engage the lip 42 and the exhaust air path is opened.

The cover assembly 16 has various passages of which only two 52,54 are shown. The passage 52 provides for supply of pressurised air from the inlet port 34 to the chamber 14. An excess pressure relief valve 56 is mounted on the housing 12 and communicates with the chamber 14. Apertures, described below, in the rotor 18 provide air paths from the chamber 14 to the ports 28,30,32, so that as the rotor turns at any time two of the arrays of the tubes 2 receive pressurised air. The third array at that time communicates with an elongate recess 24 in the rotor, which then provides an air path to the exhaust port 36 via the passage 54 in the cover assembly and the bore 38.

When the device is operative the helical spring is compressed by the incoming air pressure acting on the washer 47 and the air exhaust path is opened allowing air from the deflating array of the mattress 1 to escape through the exhaust port 36.

However, when the pressure at the air inlet port 34 drops to below the pre-set compression pressure in the spring 50, the piston 40 is lifted back into a position where the head 48 engages the lip 42, closing the exhaust air path, and preventing any further deflation of any of the tubes 2, even if the rotor 18 continues to rotate.

Figure 3:
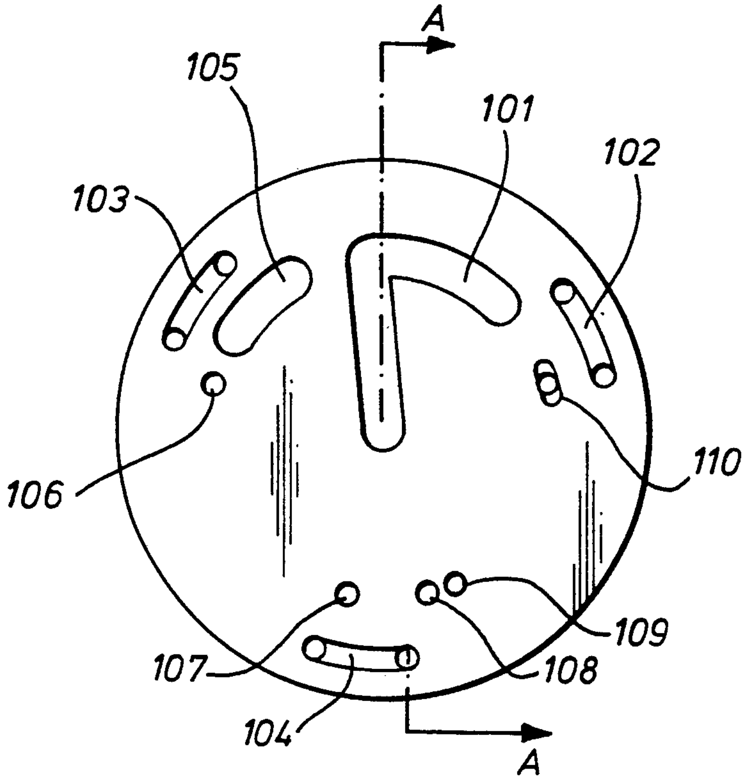
FIG. 3 is a view onto the working face of a distributor rotor of the air distributor of FIG. 2.

FIG. 3 is a view onto the working face 20 of the distributor rotor 18 which contacts the face 21 of the cover assembly. By way of the previously mentioned additional passages in the cover assembly 18 (which are not illustrated, but are comparable to those in prior US 4193149) the face 21 communicates directly with the ports 28, SO, 32 whilst avoiding the bore 38. The rotor is also provided with apertures 102 to 110, as shown in FIG. 3 and as the rotor rotates these cyclically align with the aforesaid passages which lead from the face 21 of the cover assembly to the respective ports 28, 30, 32. On each occasion the apertures align with the passages, an air path is provided from the chamber 14 to the ports 28, 30, 32, to inflate the tubes 2.

The working face 20 of the rotor 18 is additionally provided with an angular recess 101, whereby exhaustion of each port 28, 30 or 32 in turn occurs at the stage in the rotation cycle at which the recess 101 is aligned with the respective passage in the cover assembly 21 through to the relevant port. In this respect, the recess 101 allows passage of air from the relevant port 28, 30 or 32 into the bore 38 via the passage 54 for exhaust through the port 36.

As previously stated, in the event that the incoming air pressure, via inlet port 34, drops below a predetermined level, sufficient to counter the compression force of spring 50, the spring force closes off the outlet port 36 by urging the piston head 48 against the valve seat 42, so that escape of air from the mattress 1, by this route, is prevented. During use, drop in inlet air pressure is only likely to occur upon malfunction or damage to the compressor(s) supplying air or puncture of the related pipelines, and closure of the valve, constituted by piston head 48, then automatically prevents rapid deflation of the mattress 1, even upon continued operation of the distributor.

What is claimed is:

1. A fluid housing distributor having (a) a housing (b) at least one pressurized fluid inlet port to said housing (c) at least one fluid exhaust port from said housing (d) a plurality of distribution ports from said housing connectable to fluid receivers (e) a distribution rotor in said housing and fluid passages in said rotor and in said housing arranged such that, on rotation of said rotor, said rotor effects cyclically phased and sequential connection of said distribution ports to said at least one inlet port for supply of pressurized fluid to said receivers and to said at least one exhaust port for exhaustion of fluid from said receivers, (f) a valve in said housing associated with said at least one exhaust port and having an open position at which said exhaust port is open and a closed position at which said exhaust port is closed, said valve being biassed to said closed position and having a member subject to pressure of fluid applied to said at least one inlet port so that such pressure urges said valve into its said open position.

2. An assembly comprising (a) an inflatable human body support having a plurality of inflatable tubes providing a human body support surface and divided into a plurality of arrays each comprising at least one said tube, the arrays in use being sequentially inflated with air and exhausted, and (b) an air distributor having a housing, at least one pressurized inlet port to said housing, at least one air exhaust port from said housing, a plurality of distribution ports from said housing connectable to said arrays respectively, a distribution rotor in said housing and air passages in said rotor and in said housing arranged such that, on rotation of said rotor, said rotor effects cyclically phased and sequential connection of said distribution ports to said at least one inlet port for supply of pressurized air to said arrays and to said at least one exhaust port for exhaustion of air from said arrays, and a valve in said housing associated with said at least one exhaust port and having an open position at which said exhaust port is open and a closed position at which said exhaust port is closed, said valve being biassed to said closed position and having a member subject to pressure of air applied to said at least one inlet port so that such pressure urges said valve into its said open position.

3. An assembly according to claim 2 wherein said valve of said air distributor comprises a movable valve member and a valve seat engageable by said valve member, said valve seat surrounding a passage to said exhaust port, and a piston connected to said valve member to move it, said piston being subjected at one side to the air pressure at said inlet port and its other side to air pressure at said outlet port, said piston being spring-biassed into a position at which said valve member engages said valve seat thereby to close said exhaust port.

* * * * *